United States Patent [19]
Lawrence

[11] Patent Number: 5,159,848
[45] Date of Patent: Nov. 3, 1992

[54] SELF-ADJUSTING MOTOR MOUNT FOR DRIVE MOTORS OF A PEN PLOTTER

[75] Inventor: James Lawrence, Irvine, Calif.

[73] Assignee: Calcomp Inc., Anaheim, Calif.

[21] Appl. No.: 694,559

[22] Filed: May 2, 1991

[51] Int. Cl.⁵ .......................... F16H 1/12; F16H 35/06
[52] U.S. Cl. .................................. 74/421 A; 74/397; 74/399
[58] Field of Search ................ 74/209, 397, 398, 399, 74/421 A, 409, 392

[56] References Cited

U.S. PATENT DOCUMENTS

| | | | |
|---|---|---|---|
| 752,778 | 2/1904 | Hundhausen | 74/209 |
| 2,397,777 | 4/1946 | Colman | 74/399 X |
| 2,703,497 | 3/1955 | Townsend | 74/399 |
| 3,796,105 | 3/1974 | Menard | 74/209 |
| 4,438,879 | 3/1984 | Rudi | 74/209 X |
| 4,583,415 | 4/1986 | Locker | 74/397 X |

Primary Examiner—Leslie A. Braun
Assistant Examiner—David W. Laub
Attorney, Agent, or Firm—Donald A. Streck; Wm. F. Porter, Jr.

[57] ABSTRACT

This invention is a self-adjusting motor mount for holding a driving gear mounted on the shaft of a motor in engagement with a driven gear carried by a back plate disposed in a vertical plane and is particularly useful in a pen plotter. There is a mounting plate carrying the motor and the driving gear. A pivotal mounting carried by the back plate attaches the mounting plate to the back plate at a point above the motor for pivotal movement so as to have the motor pivotally hang from the point. There is a bias spring for resiliently urging the mounting plate to carry the driving gear into engagement with the driven gear. Finally, there is a shock absorber carried by the back plate for absorbing pivotal gear disengaging movement of the mounting plate.

14 Claims, 2 Drawing Sheets

SELF-ADJUSTING MOTOR MOUNT FOR DRIVE MOTORS OF A PEN PLOTTER

BACKGROUND OF THE INVENTIONS

This invention relates to motor-driven gear trains and, more particularly, to a self-adjusting motor mount for holding a driving gear mounted on the shaft of a motor in engagement with a driven gear carried by a back plate disposed in a vertical plane comprising, a mounting plate carrying the motor and the driving gear; pivotal mounting means carried by the back plate for attaching the mounting plate to the back plate at a point above the motor for pivotal movement therearound so as to have the motor pivotally hang from the point; bias means for resiliently urging the mounting plate to carry the driving gear into engagement with the driven gear; and, shock absorber means carried by the back plate for absorbing pivotal gear disengaging movement of the mounting plate.

There are many applications in which a driving gear on the shaft of a driving motor is mounted to engage a driven gear. In most such applications, the motor is simply bolted in place adjacent the driven gear and the two gears mesh sufficiently for the intended purpose. Where finer adjustment is desired, the approach of FIGS. 1 and 2 is commonly employed. The motor 10 is attached to a mounting plate 12. One side of the mounting plate 12 has a first projecting tab 14 having a hole therethrough through which a first mounting screw 16 passes into threaded engagement with the back plate 18 which carries the entire assembly. Thus, the mounting plate 12 is free to pivot about the screw 16. The other side of the mounting plate 12 has a second projecting tab 20 having a slot 22 therethrough through which a second mounting screw 24 passes into threaded engagement with the back plate 18. To assemble the parts, the mounting plate 12 is loosely attached to the back plate 18 with the mounting screws 16, 24 and pivoted about the first mounting screw 16 until the driven gear 26 and drivig gear 28 are properly meshed. The two mounting screws 16, 24 are then tightened to hold everything in place.

Most precision equipment as wherein the above-described prior art mounting approach is applied is of a small size such that there are very little, if any, shock forces on the mounting structure. Also, there is very little wear in the parts which can cause problems. By contrast, a pen plotter is quite large with correspondingly large parts. On the other hand, it is by necessity a precision instrument in every sense of the word. When the above-described prior art motor mounting system is employed to mount the motors driving the driving drum and the plotting head, shocks of moving the plotter during initial delivery or subsequent relocation can move the driving and driven gears 28, 26 out of alignment. Moreover, pressures of use can cause wear and uneven wear in the gears 28, 26 causing "jitter", which can effect the plot quality, and audible noise, which is simply annoying. The inability to provide close gear contact or non-parallel alignment of the gears 28, 26 can also result in backlash, and the like, which effects plot quality.

Wherefore, it is an object of this invention to provide a motor mount for use in gear drives of large precision instruments such as pen plotters and the like which is self-adjusting so as to automatically compensate for shock movement and wear in the gears and environmental changes that could cause uncoupling of the mating gears.

It is another object of this invention to provide a motor mount for use in gear drives of large precision instruments such as pen plotters and the like in which driving gears and driven gears are kept in a parallel orientation with one another.

It is still another object of this invention to provide a motor mount for use in gear drives of large precision instruments such as pen plotters and the like in which driving gears and driven gears are kept in optimum engagement so as to reduce or eliminate backlash.

Other objects and benefits of the invention will become apparent from the detailed description which follows hereinafter when taken in conjunction with the drawing figures which accompany it.

SUMMARY

The foregoing objects have been attained in a motor mount for holding a driving gear mounted on the shaft of a motor mounted on a mounting plate mounted to a back plate disposed in a vertical plane in engagement with a driven gear carried by the back plate, by the improvement of the present invention for providing self-adjusting of the relationship between the driving gear and the driven gear comprising, pivotal mounting means carried by the back plate for attaching the mounting plate to the back plate at a point above the motor for pivotal movement therearound so as to have the motor pivotally hang from the point; bias means for resiliently urging the mounting plate to carry the driving gear into engagement with the driven gear; and, shock absorber means carried by the back plate for absorbing pivotal gear disengaging movement of the mounting plate.

In the preferred embodiment, the mounting plate includes stabilizing tab means extending outward therefrom for sliding along a surface of the back plate so as to hold the driving gear parallel to the driven gear.

Also in the preferred embodiment, the pivotal mounting means comprises a bore through the mounting plate and a mounting screw passing through the mounting plate into threaded engagement with the back plate.

Additionally in the preferred embodiment, the shock absorber means comprises a bumper of a rubber-like material carried by the back plate against which the mounting plate can strike; and, the bias means comprises a spring carried by the back plate. Preferably, the spring is a coil spring carried by the back plate on one end and attached to the mounting plate on an opposite end.

DESCRIPTION OF THE PREFERRED EMBODIMENT

Figure 1:
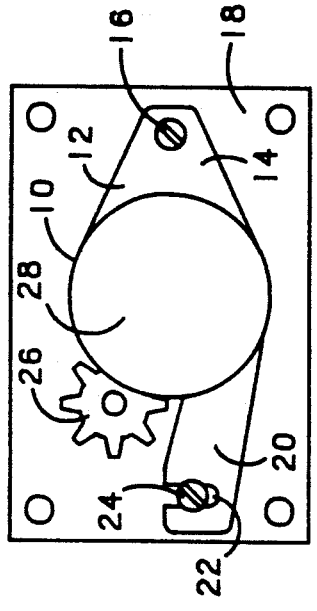
FIG. 1 is a drawing of a motor mount according to the prior art at the gear level.
Figure 2:
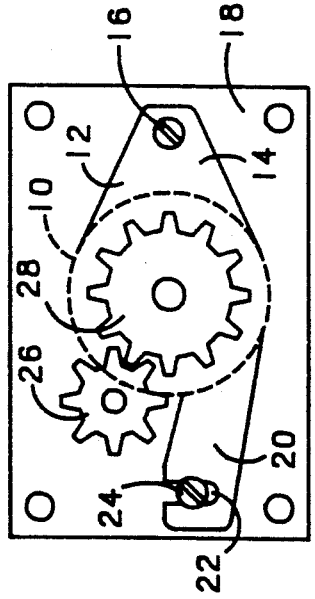
FIG. 2 is a drawing of a motor mount according to the prior art as in FIG. 1 shown from behind the driving motor.
Figure 3:
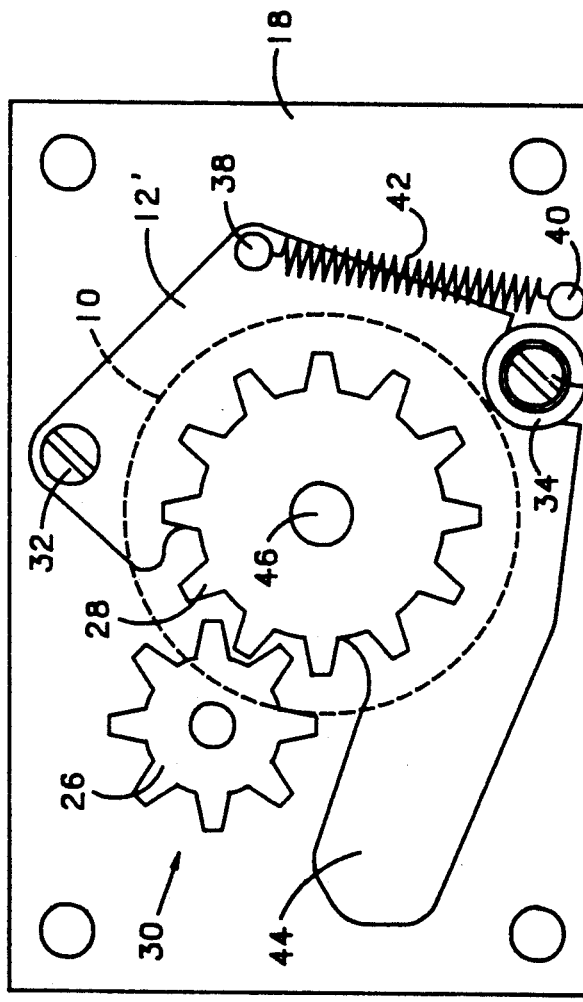
FIG. 3 is an enlarged drawing of a motor mount according to the present invention at the gear level.
Figure 4:
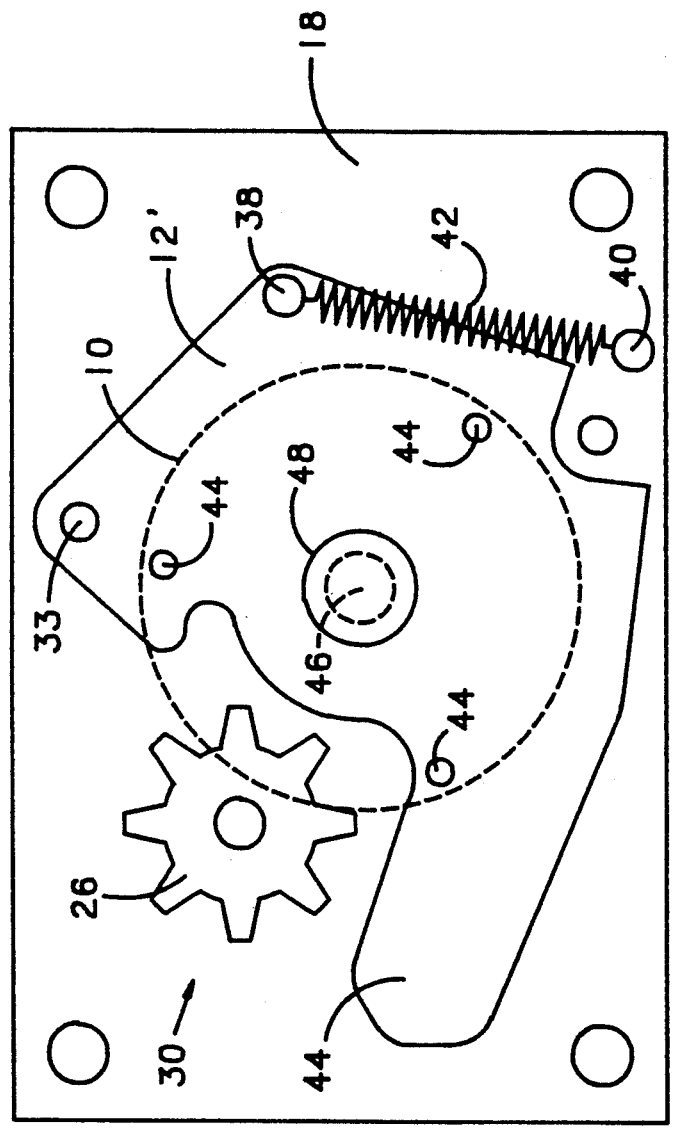
FIG. 4 is a drawing of the motor mount according to the present invention of FIG. 3 with the motor and driving gear removed to show the details of the mounting plate thereof.

The self-adjusting motor mount of the present invention is shown in FIGS. 3 and 4 where it is generally indicated as 30. The key to the self-adjusting motor mount 30 is the mounting plate 12'. Like the prior art mounting plate 12, the mounting plate 12' has the motor 10 attached thereto by means of screws passing through the attachment holes 44 into threaded holes provided therefor in the body of the motor 10. The shaft 46 of the motor 10, of course, passes through the hole 48 in the mounting plate 12' provided therefor in the usual manner. While the prior art mounting plate 12 of FIGS. 1 and 2 suspended the weight of the motor 10 between the two horizontally-opposed mounting screws 16, 24 for adjustment movement up and down as the figures are viewed, the mounting plate 12' of this invention essentially hangs the weight of the motor 10 (and the mounting plate 12' itself) from a single mounting screw 32 at the top of the mounting plate 12' as FIGS. 3 and 4 are viewed. The mounting screw 32 passes through the hole 33 in the mounting plate 12' into threaded engagement with the back plate 18. While the mounting screws 16, 24 of the prior art approach were (and had to be) snugly tightened, the single mounting screw 32 of this invention is tightened only sufficiently to hold the mounting plate 12' from wobbling on the mounting screw 32; but, so as to allow pivoting motion of the mounting plate 12' about the mounting screw 32 as necessary for self adjustment.

A rubber bumper 34 carried by the screw 36 (also threaded into the back plate 18) is disposed adjacent the bottom of the mounting plate 12'. In the event of shock to the motor mount 30 such as through dropping of a pen plotter in which it is used, the rubber bumper 34 absorbs the shock to prevent injury to the parts as could otherwise occur. In testing of the present invention in a pen plotter to be sold commercially in the future by the assignee of this application, the pen plotter was intentionally dropped several times in an amount which would have required readjusting the motor mounts had the prior art approach of FIGS. 1 and 2 been employed. In each case, the rubber bumper 34 absorbed the shock without damage to the parts and the motor mount 30 readjusted itself automatically. It should be noted that because in the motor mount 30 of this invention the motor 12 hangs from a point above it in the motor mount 30 and the most common shocks will be gravity produced shocks as from dropping and the like, the effect of the shocks will be to disengage the gears 26, 28 and transfer the shock to the rubber bumper 34 rather than driving the gears 26, 28 into a damaging overengagement. The rubber bumper 34 can be made of natural rubber, synthetic rubber, or any rubber-like material such as a soft plastic or dense plastic foam.

To further aid in the self-adjusting and stability aspects of the motor mount 30 of this invention, a first mounting post 38 is carried by the mounting plate 12' offset from the center of gravity under the mounting screw 32 on the side opposite the driven gear 26. A second mounting post 40 is carried by the back plate 18 at the bottom thereof. A coil spring 42 is stretched between the two mounting posts 38, 40 so as to create a biasing force on the mounting plate 12' tending to rotate it towards the driven gear 26 such that the driven gear 26 and driving gear 28 are gently (but resiliently) urged into engagement. A stability tab 44 extends outward from the mounting plate 12' on the side opposite the mounting post 38 and slides along the surface of the back plate 18 so as to help hold the two gears 26, 28 in parallel planes. Thus, it can be seen that with the motor mount 30 of this invention, the two gears 26, 28 are constantly urged into optimum parallel engagement so as to reduce backlash to a minimum while, at the same time, allowing the two gears 26, 28 to move apart and together during normal operation of the device as necessary to account for uneven wear and the like.

Wherefore, having thus described the present invention, what is claimed is:

1. A self-adjusting motor mount for holding a driving gear mounted on the shaft of a motor in engagement with a driven gear carried by a back plate disposed in a vertical plane comprising:
    a) a mounting plate carrying the motor and the driving gear;
    b) pivotal mounting means carried by the back plate for attaching said mounting plate to the back plate at a point above the motor for pivotal movement therearound so as to have the motor pivotally hang from said point;
    c) bias means for resiliently urging the mounting plate to carry the driving gear in a first direction into engagement with the driven gear; and,
    d) shock absorber means carried by the back plate for absorbing pivotal gear-disengaging movement of said mounting plate in a second direction opposite said first direction.

2. The self-adjusting motor mount of claim 1 wherein: said mounting plate includes stabilizing tab means extending outward therefrom for sliding along a surface of the back plate so as to hold an axis of the driving gear parallel to an axis of the driven gear.

3. The self-adjusting motor mount of claim 1 wherein said pivotal mounting means comprises:
    a) a bore through said mounting plate; and,
    b) a mounting screw passing through said mounting plate into threaded engagement with the back plate.

4. The self-adjusting motor mount of claim 1 wherein said shock absorber means comprises:
    a bumper of a rubber-like material carried by the back plate against which said mounting plate can strike.

5. The self-adjusting motor mount of claim 1 wherein said bias means comprises:
    a spring carried by the back plate.

6. The self-adjusting motor mount of claim 5 wherein: said spring is a coil spring carried by the back plate on one end and attached to said mounting plate on an opposite end.

7. In a motor mount for holding a driving gear mounted on the shaft of a motor mounted on a mounting plate mounted to a back plate disposed in a vertical plane in engagement with a driven gear carried by the back plate, the improvement for providing self-adjusting of the relationship between the driving gear and the driven gear comprising:
    a) pivotal mounting means carried by the back plate for attaching the mounting plate to the back plate at a point above the motor for pivotal movement therearound so as to have the motor pivotally hang from said point;
    b) bias means for resiliently urging the mounting plate to carry the driving gear in a first direction into engagement with the driven gear; and, c) shock absorber means carried by the back plate for absorbing pivotal gear-disengaging movement of the mounting plate in a second direction opposite said first direction.

8. The improvement to a motor mount of claim 7 wherein:
the mounting plate includes stabilizing tab means extending outward therefrom for sliding along a surface of the back plate so as to hold an axis of the driving gear parallel to an axis of the driven gear.

9. The improvement to a motor mount of claim 7 wherein said pivotal mounting means comprises:
   a) a bore through the mounting plate; and,
   b) a mounting screw passing through the mounting plate into threaded engagement with the back plate.

10. The improvement to a motor mount of claim 7 wherein said shock absorber means comprises:
a bumper of a rubber-like material carried by the back plate against which the mounting plate can strike.

11. The improvement to a motor mount of claim 7 wherein said bias means comprises:
a spring carried by the back plate.

12. The improvement to a motor mount of claim 11 wherein:
said spring is a coil spring carried by the back plate on one end and attached to the mounting plate on an opposite end.

13. A self-adjusting motor mount for holding a driving gear mounted on the shaft of a motor in engagement with a driven gear carried by a back plate disposed in a vertical plane comprising:

a) a mounting plate carrying the motor and the driving gear, said mounting plate including stabilizing tab means extending outward therefrom for sliding along a surface of the back plate so as to hold an axis of the driving gear parallel to an axis of the driven gear;
b) pivotal mounting means carried by the back plate for attaching said mounting plate to the back plate at a point above the motor for pivotal movement therearound so as to have the motor pivotally hang from said point, said pivotal mounting means comprising
b1) a bore through said mounting plate, and
b2) a mounting screw passing through said mounting plate into threaded engagement with the back plate;
c) a spring carried by the back plate and connected to the mounting plate for resiliently urging the driving gear in a first direction into engagement with the driven gear; and
d) shock absorber means carried by the back plate for absorbing pivotal gear-disengaging movement of said mounting plate in a second direction opposite said first direction, said shock absorber means comprising a bumper of a rubber-like material carried by the back plate against which said mounting plate can strike.

14. The self-adjusting motor mount of claim 13 wherein:
said spring is a coil spring carried by the back plate on one end and attached to said mounting plate on an opposite end.

* * * * *